United States Patent [19]

Takada et al.

[11] Patent Number: 4,918,042

[45] Date of Patent: Apr. 17, 1990

[54] EXHAUST GAS PURIFYING CATALYST

[75] Inventors: Toshihiro Takada, Toyota; Shinichi Matsumoto, Aichi; Hikaru Aoyagi, Toyota; Mikio Yamanaka, Yamato; Keiichi Ohmura, Sagamihara; Toshiyuki Yashiro, Tokyo, all of Japan

[73] Assignees: Toyota Jidosha Kabushiki Kaisha; Nippon Steel Corporation; Nippon Kinzoku Co., Ltd., all of Tokyo, Japan

[21] Appl. No.: 216,687

[22] Filed: Jul. 8, 1988

[30] Foreign Application Priority Data

Jul. 9, 1987 [JP] Japan ................. 62-171725

[51] Int. Cl.⁴ .................. B01J 21/04; B01J 21/06; B01J 23/86
[52] U.S. Cl. ................. 502/314; 502/327; 502/439; 423/213.5
[58] Field of Search ......... 502/314, 327, 439; 423/213.5

[56] References Cited

U.S. PATENT DOCUMENTS

| 3,920,583 | 11/1975 | Pugh | 502/314 |
| 4,096,095 | 6/1978 | Cairns | 502/314 |
| 4,233,189 | 11/1980 | Gandhi et al. | 502/325 |
| 4,277,374 | 7/1981 | Lula et al. | 252/446 |
| 4,318,828 | 3/1982 | Chapman | 252/465 |
| 4,367,162 | 1/1983 | Fujitani et al. | 502/178 |
| 4,673,663 | 6/1987 | Magnier | 502/439 X |

FOREIGN PATENT DOCUMENTS

| 54-15035 | 6/1979 | Japan . |
| 56-12446 | 9/1981 | Japan . |
| 57-68143 | 4/1982 | Japan . |
| 57-71898 | 5/1982 | Japan . |
| 58-23138 | 5/1983 | Japan . |
| 1490977 | 11/1977 | United Kingdom . |
| 1492929 | 11/1977 | United Kingdom . |

Primary Examiner—W. J. Shine
Attorney, Agent, or Firm—Finnegan, Henderson, Farabow, Garrett, Dunner

[57] ABSTRACT

An exhaust gas purifying catalyst of this invention comprises a heat resistance stainless steel catalyst support, an oxide film containing zirconium oxide formed on the heat resistance stainless steel catalyst support, an activated alumina catalyst carrier layer formed on the oxide film, and at least one metal catalyst loaded in the activated alumina catalyst carrier layer. Thus, the activated alumina catalyst carrier layer's come-off from the catalyst support and the oxidation of the catalyst support are suppressed at the same time, and the conversions of the hydrocarbons (HC), carbon monoxide (CO) and nitrogen oxides (NOx) are also improved.

24 Claims, 3 Drawing Sheets

EXHAUST GAS PURIFYING CATALYST

BACKGROUND OF THE INVENTION

1. Field of the Invention

This invention relates to an exhaust gas purifying catalyst.

2. Discussion of the Background

A ferrite heat resistance stainless steel plate containing aluminum has been used as a catalyst support for an automobile exhaust gas purifying catalyst. One of the ferrite heat resistance stainless steel plates is disclosed in Japanese Examined Patent Publication (KOKOKU) No. 23138/1983, and contains the following: 3 to 40% by weight of chromium; 1 to 10% by weight of aluminum; 1 to 5% by weight of cobalt; 0 to 72% by weight of nickel; 0 to 0.5% by weight of carbon; and the balance of iron. The surface of this ferrite heat resistance stainless steel plate is oxidized to form an alumina film.

Further, Japanese Unexamined Patent Publication (KOKAI) No. 68143/1982 discloses an improvement on an activated alumina catalyst carrier layer forming method on the alumina film of a catalyst support. In this method, the surface of Fe-Cr-Al-Ti-Zr alloy catalyst support is covered with a film which contains TiZr alloy solidifying in alpha-alumina or a film which contains alpha-alumina as a major component and oxides of titanium (Ti) and zirconium (Zr) as minor components.

Furthermore, Japanese Unexamined Patent Publication (KOKAI) No. 71898/1982 discloses a method, in which the heat resistance ferrite stainless steel plate is oxidized with a small volume of oxygen to form alumina whiskers on the surface of the catalyst support to strengthen the adhesion between the activated alumina catalyst carrier layer and the catalyst support.

The conventional techniques form an alumina film on the ferrite heat resistance stainless steel plates containing aluminum by heat or chemical treatment. The ferrite heat resistance stainless steel plates covered with the alumina film are used for catalyst supports, since it has been believed that the alumina film suppresses the propagation of the oxidation into the catalyst supports and increases the adhesion strength between the catalyst supports and the activated alumina catalyst carrier layer to be coated thereon.

However, it is hard to cover the ferrite heat resistance stainless steel plates with the alumina film evenly by the conventional techniques since the alumina film is produced out of the aluminum contained in the ferrite heat resistance stainless steel plates. As the aluminum in the ferrite heat resistance stainless steel plates is consumed, for instance, to 2% by weight or less based on the total weight of the ferrite heat resistance stainless steel plates, chromium and iron become susceptible to oxidation. In addition, as thus formed alumina film transforms from one state to the other, the alumina film is come off the ferrite heat resistance stainless steel plates and the come-off portions are likely to be oxidized.

SUMMARY OF THE INVENTION

It is therefore an object of this invention to improve the durability or the oxidation resistance of a metal catalyst support of an exhaust gas purifying catalyst.

And it is a further object of this invention to improve the adhesion strength between the catalyst support and the activated alumina catalyst carrier layer of an exhaust gas purifying catalyst.

An exhaust gas purifying catalyst of this invention comprises a heat resistance stainless steel catalyst support, an oxide film containing zirconium oxide formed on the heat resistance stainless steel catalyst support, an activated alumina catalyst carrier layer formed on the oxide film, and at least one metal catalyst loaded in the activated alumina catalyst carrier layer.

As heat resistance stainless steel for the heat resistance stainless steel catalyst support, a martensite heat resistance stainless steel, a ferrite heat resistance stainless steel and an austenite heat resistance stainless steel may be used. For instance, the stainless steel may be the one comprising 30% or less by weight of chromium and the balance of iron, or the one comprising 30% or less by weight of chromium, 20% or less by weight of aluminum and the balance of iron. The stainless steel may further comprise zirconium. The heat resistance stainless steel is formed into a flat plate and a corrugated plate. The corrugated plate is placed on the flat plate, and the overlapped plates are wound into a cylindrical form to use them as a honeycomb heat resistance stainless steel catalyst support.

The oxide film may be formed on the heat resistance stainless steel catalyst support either before or after forming the honeycomb heat resistance stainless steel catalyst support, and a metal film may interpose between the heat resistance stainless steel catalyst support and the oxide film. Zirconium or zirconium and aluminum may be formed into the oxide film, and they may be contained in the heat resistance stainless steel catalyst support or additionally provided thereon. The film may preferably comprise zirconium and aluminum, in total, for example, of from 0.01 to 40 parts by weight per 100 parts by weight of the catalyst support, but also may comprise from 0.01 to 30 parts by weight of zirconium per 100 parts by weight of a catalyst support and from 0.01 to 30 parts by weight of aluminum per 100 parts by weight of a catalyst support.

Following are available for a method for forming the oxide film on the heat resistance stainless steel catalyst support, but the method is not limited thereto as far as it forms a film firmly adhering on the catalyst support: spraying, immersion plating, electroplating and metal foil application with rolls, followed by heating at a temperature of from 600° to 1000° C. Thus, a film formed on the catalyst support is completely oxidized to the oxide film or covered with its oxides. When forming the film on the catalyst support, zirconium may be deposited first and then aluminum may be deposited on the catalyst support, or vice versa, or zirconium and aluminum may be simultaneously deposited on the catalyst support. In addition, zirconium-aluminum alloy foil may be applied to the catalyst support. Further, only zirconium may be deposited on the catalyst support containing aluminum, or the catalyst support containing zirconium and aluminum may be oxidized by heating to form the oxide film.

The activated alumina catalyst carrier layer is formed by a well known method: The heat resistance steel catalyst support is immersed into a slurry made of an activated alumina powder and an alumina binder. And the catalyst support is dried and calcined to form the activated alumina catalyst carrier layer. The activated alumina catalyst carrier layer may include at least one oxide of rare-earth element like cerium and lanthanum.

The metal catalyst is loaded in the activated aluminum catalyst carrier layer also by a well known method: The heat resistance stainless steel catalyst support is immersed into an aqueous solution of platinum, palladium or rhodium salt to load the metal catalysts in the activated aluminum catalyst carrier layer.

As the oxide film containing zirconium oxide is formed on the heat resistance stainless steel catalyst support, alpha-alumina formation on the catalyst support is suppressed. Thus, the catalyst support is firmly bonded to the activated alumina catalyst carrier layer mainly comprising gamma-alumina, theta-alumina and delta-alumina. Consequently, the activated alumina catalyst carrier layer's come-off from the catalyst support and the oxidation of the catalyst support are suppressed at the same time. And the metal catalyst loaded in the activated alumina catalyst carrier layer works efficiently and the conversions of the hydrocarbons (HC), carbon monoxide (CO) and nitrogen oxides (NOx) are improved.

DETAILED DESCRIPTION OF THE PREFERRED EMBODIMENT

Figure 1:
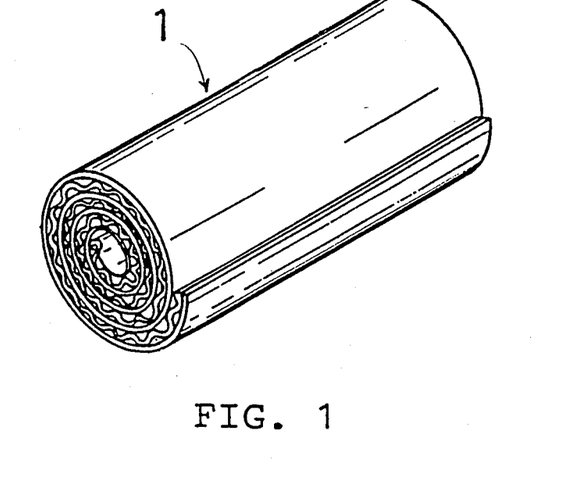
FIG. 1 is a perspective view of a catalyst support employed by an exhaust gas purifying catalyst according to this invention.
Figure 2:
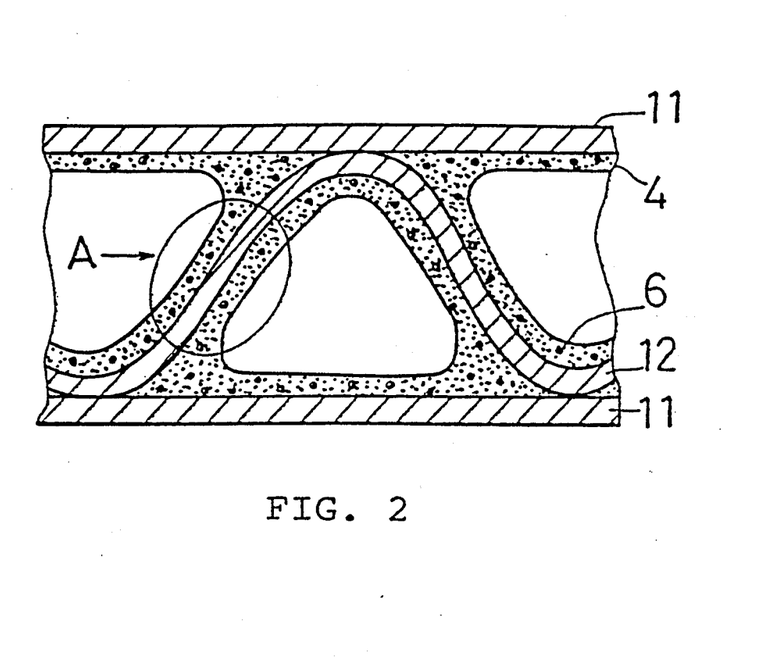
FIG. 2 is a schematic sectional view, in part, of a preferred embodiment of an exhaust gas purifying catalyst according to this invention.
Figure 3:
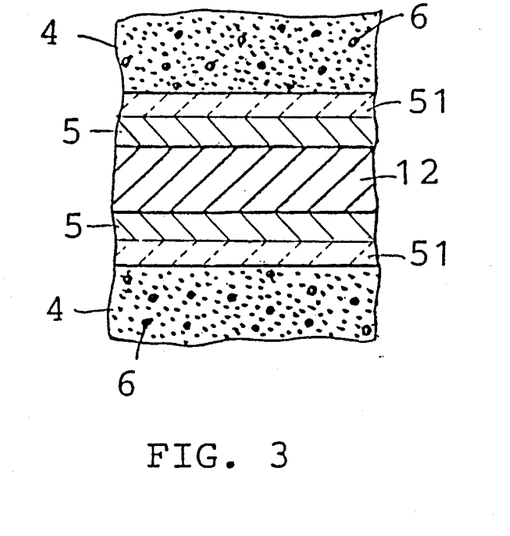
FIG. 3 is an enlarged schematic sectional view of portion "A" in FIG. 2.
Figure 4:
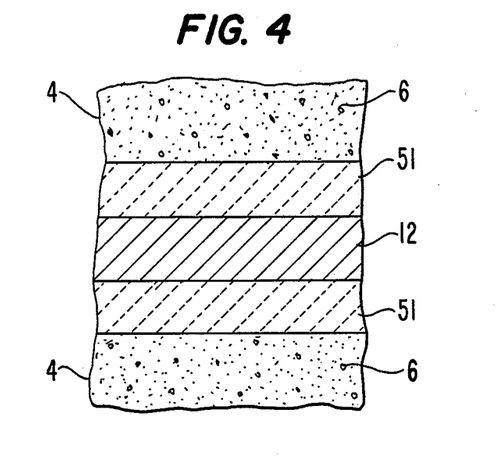
FIG. 4 is an enlarged schematic sectional view of a first preferred embodiment of an exhaust gas purifying catalyst according to the present invention.

This invention will be hereinafter described with reference to preferred embodiments. The preferred embodiments employed a catalyst support 1 as illustrated in FIG. 1. And as shown in the schematic sectional view of FIG. 2, the preferred embodiments of an exhaust gas purifying catalyst according to this invention had a catalyst support 1 made of a flat heat resistance stainless steel plate 11 and a corrugated heat resistance stainless steel plate 12. The surface of the catalyst support 1 was covered with a metal film 5 and an oxide film 51, or an oxide film 51 only, made of zirconium or zirconium and aluminum as illustrated in FIGS. 3 and 4. The metal film 5 and the oxide film 51, or the oxide film 51 only, were covered with an activated alumina catalyst carrier layer 4 loaded with at least one metal catalyst 6.

First Preferred Embodiments

The exhaust gas purifying catalysts of first preferred embodiments were produced as follows:

A ferrite stainless steel flat sheet containing 15% by weight of chromium was prepared. Zirconium and aluminum were sprayed on the both surfaces of the flat sheet in amounts listed in lines of the first preferred embodiments in Table 1 in the following order, i.e. zirconium was sprayed in the first spraying, and aluminum was sprayed in the second spraying. Thus, a metal film 5 shown in FIG. 3 was formed. The flat sheet thus sprayed was formed into a flat plate and a corrugated plate. The corrugated plate was placed on the flat plate, and the overlapped plates were wound into a cylindrical form to use them as a honeycomb catalyst support 1.

Then, the catalyst support 1 was immersed into a slurry which was made by stirring an activated alumina powder, an alumina binder and water. After taking out of the slurry, the excess slurry was blown off the catalyst support 1, and the catalyst support 1 was heated at 200° C. to dry. And then, the catalyst support 1 was calcined at 600° C. for 2 hours to form oxide film 51 on the metal film 5 shown in FIG. 3, or the oxide film 51 only, shown in FIG. 4 and the activated alumina catalyst carrier layer 4 on its surface. The amounts of zirconium and aluminum contained in the metal film 5 and the oxide film 51 thus formed are listed in Table 1, and are parts by weight per 100 parts by weight of a catalyst support.

Next, the catalyst support with the activated alumina catalyst surface 4 was immersed into an aqueous solution of ammine platinum to load platinum by 1.0 g per 1 liter volume of a catalyst, and then into an aqueous solution of rhodium chloride to load rhodium 0.2 g per 1 liter volume of a catalyst.

Thus, catalysts Nos. 1 through 7 were produced. However, note that when producing the catalyst No. 7, aluminum was sprayed first and then zirconium was sprayed.

Second Preferred Embodiments

These preferred embodiments employed immersion plating for forming the metal film 5 instead of the spraying employed in the first preferred embodiments.

Figure 5:
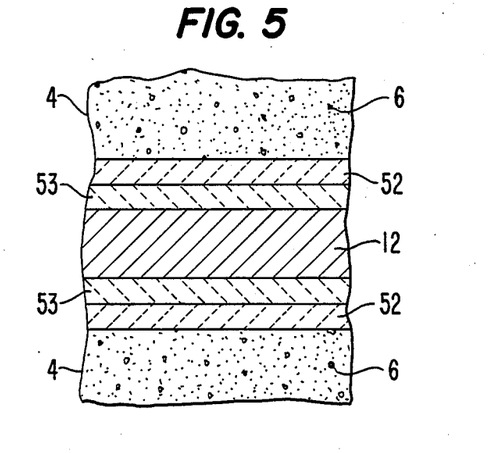
FIG. 5 is an enlarged schematic sectional view of a second preferred embodiment of an exhaust gas purifying catalyst according to the present invention.

A ferrite stainless steel flat sheet containing 15% by weight of chromium was formed into the honeycomb catalyst support 1 as described for the first preferred embodiments. Then, the catalyst support 1 was immersed into an aqueous solution of oxynitrate zirconium. After the immersion, the catalyst support was heated at 200° C. to dry, and calcined at 600° C. for 2 hours to form the oxide film 52 of zirconium, shown in FIG. 5, in amounts shown in lines of the second preferred embodiments in Table 1. Next, the catalyst support 1 was immersed into an aqueous solution of aluminum nitrate. After the immersion, the catalyst support 1 was heated at 200° C. to dry, and calcined at 600° C. for 2 hours to form the oxide film 53, shown in FIG. 5, of aluminum in amounts shown in the lines of the second preferred embodiments in Table 1. The amounts of zirconium and aluminum are parts by weight per 100 parts by weight of a catalyst support.

After forming the oxide films 52 and 53, the activated alumina catalyst carrier layer 4 was formed on the catalyst support 1 and the metal catalysts 6, i.e. platinum and rhodium, were loaded in the activated alumina catalyst carrier layer 4 to produce catalysts Nos. 8 through 14 as described for the first preferred embodiments. But in catalyst No. 14, aluminum was plated before plating zirconium. Namely, the catalyst No. 14 had the oxide film of aluminum designated at 53 and the oxide film of zirconium designated at 52 in FIG. 5.

Third Preferred Embodiment

These preferred embodiments employed an electroplating for forming the metal film 5 instead of the spraying employed in the first preferred embodiments.

A ferrite solution steel flat sheet containing 15% by weight of chromium was prepared. Then, the ferrite stainless steel flat sheet was electroplated in an aqueous solution of oxynitrate zirconium. After the ferrite stainless steel flat sheet was dried, the ferrite stainless steel flat sheet was electroplated in an aqueous solution of aluminum nitrate. The amounts of zirconium and aluminum in Table 1 are parts by weight per 100 parts by weight of a catalyst support. After drying, the electroplated ferrite stainless steel flat sheet was formed into the honeycomb catalyst support 1 as described for the first preferred embodiments.

After forming the honeycomb catalyst support 1, the activated alumina catalyst carrier layer 4 was formed on the catalyst support 1 and the metal catalysts 6, i.e. platinum and rhodium, were loaded in the activated alumina catalyst carrier layer 4 to produce catalysts Nos. 15 through 21 as described for the first preferred embodiments. Note that the metal film 5 and the oxide film 51, or the oxide film 51 only, were formed during the calcination of the activated alumina catalyst carrier layer 4 in these preferred embodiments. But in catalyst No. 21, aluminum was electroplated before electroplating zirconium.

Fourth Preferred Embodiments

These preferred embodiments employed a foil application with rolls for forming the metal film 5 instead of the spraying employed in the first preferred embodiments.

A ferrite stainless steel flat sheet containing 15% by weight of chromium was prepared. And a zirconium foil and an aluminum foil were applied on both surfaces of the ferrite stainless steel flat sheet by a foil application with rolls to prepare a laminated ferrite stainless steel flat sheet. The amounts of zirconium and aluminum applied are shown in lines of the fourth preferred embodiments in Table 2, and the amounts are parts by weight per 100 parts by weight of a catalyst support. And the laminated ferrite stainless steel flat sheet was formed into a flat plate and a corrugated plate. The corrugated plate was placed on the flat plate, and the overlapped plates were wound into a cylindrical form to use them as the honeycomb catalyst support 1.

After forming catalyst support 1, the activated alumina catalyst carrier layer 4 was formed on the catalyst support 1 and the metal catalysts 6, i.e. platinum and rhodium, were loaded in the activated alumina catalyst carrier layer 4 to produce catalysts Nos. 22 through 28 as described for the first preferred embodiments. Note that the metal film 5 and the oxide film 51, or the oxide film 51 only, were formed during the calcination of the activated alumina catalyst carrier layer 4 in these preferred embodiments. But in catalyst No. 28, the aluminum foil was applied before applying the zirconium foil.

Fifth Preferred Embodiments

These preferred embodiments employed spraying in which zirconium and aluminum were sprayed simultaneously to form the metal film 5.

A ferrite stainless steel flat sheet containing 15% by weight of chromium was prepared. Then, zirconium and aluminum were sprayed simultaneously on both surfaces of the ferrite stainless steel flat sheet to form the metal film 5 made of zirconium and aluminum in amounts shown in lines of the fifth preferred embodiments. The amounts in Table 2 are parts by weight per 100 parts by weight of a catalyst support. And the sprayed ferrite stainless steel flat sheet was formed into the honeycomb catalyst support 1 as described for the first preferred embodiments.

After the spraying, the activated alumina catalyst carrier layer 4 was formed on the catalyst support 1 and the metal catalysts 6, i.e. platinum and rhodium, were loaded in the activated alumina catalyst carrier layer 4 to produce catalysts Nos. 29 through 34 as described for the first preferred embodiments. Note that the metal film 5 and the oxide film 51, or the oxide film 51 only, were formed during the calcination of the activated alumina catalyst layer 4 in these preferred embodiments.

Sixth Preferred Embodiments

These preferred embodiments employed immersion plating for forming the metal film 5 as shown in FIG. 3 instead of the spraying employed in the fifth preferred embodiments.

A ferrite stainless steel flat sheet containing 15% by weight of chromium was formed into the honeycomb catalyst support 1 as described for the first preferred embodiments.

Then, the catalyst support 1 was immersed into a mixed aqueous solution of oxynitrate zirconium and aluminum nitrate. After the immersion, the catalyst support 1 was heated at 200° C. to dry, and calcined at 600° C. for 2 hours to form the metal film 5 and the oxide film 51, or the oxide film 51 only, made of zirconium and aluminum on it in amounts shown in lines of the sixth preferred embodiments in Table 2. The amounts in Table 2 are parts by weight per 100 parts by weight of a catalyst support.

After forming the metal film 5 and the oxide film 51, or the oxide film 51 only, the activated alumina catalyst carrier layer 4 was formed on the catalyst support 1 and the metal catalysts 6, i.e. platinum and rhodium, were loaded in the activated alumina catalyst carrier layer 4 to produce catalysts Nos. 35 through 40 as described for the first preferred embodiments.

Seventh Preferred Embodiments

These preferred embodiments employed electroplating for forming the metal film 5 as shown in FIG. 3 instead of the spraying employed in the fifth preferred embodiments.

A ferrite stainless steel flat sheet containing 15% by weight of chromium was prepared. The ferrite stainless steel flat sheet was electroplated in a mixed aqueous solution of oxynitrate zirconium and aluminum nitrate to form the metal film 5, on it in amounts shown in lines of the seventh preferred embodiments in Table 3. The amounts in Table 3 are parts by weight per 100 parts by weight of a catalyst support.

After the electroplating, the electroplated flat sheet was formed into the honeycomb catalyst support 1 as described for the first preferred embodiments. Then, the activated alumina catalyst carrier layer 4 was formed on the catalyst support 1 and the metal catalysts 6, i.e. platinum and rhodium, were loaded in the activated alumina catalyst carrier layer 4 to produce catalysts Nos. 41 through 46 as described for the first preferred embodiments. Note that the metal film 5 and the oxide film 51, or the oxide film 51 only, were formed during the calcination of the activated alumina catalyst carrier layer 4 in these preferred embodiments.

Eighth Preferred Embodiments

These preferred embodiments employed alloy foil application with rolls for forming the metal film 5 as shown in FIG. 3 instead of the spraying employed in the fifth preferred embodiments.

A ferrite stainless steel flat sheet containing 15% by weight of chromium was prepared. And a zirconium-aluminum alloy foil was applied on both surfaces of the ferrite stainless steel flat sheet by foil application with rolls to prepare a laminated ferrite stainless steel flat sheet. The zirconium-aluminum alloy foil was prepared by rapidly quenching molten zirconium and aluminum. The amounts of zirconium and aluminum in the alloy film are shown in lines of the eighth preferred embodiments in Table 3, and the amounts are parts by weight per 100 parts by weight of a catalyst support. Then, the laminated ferrite stainless steel flat sheet was formed into the honeycomb catalyst support 1 as described for the first preferred embodiments.

After forming the catalyst support 1, the activated alumina catalyst carrier layer 4 was formed on the catalyst support 1 and the metal catalysts 6, i.e. platinum and rhodium, were loaded in the activated alumina catalyst carrier layer 4 to produce catalysts Nos. 47 through 52 as described for the first preferred embodiments. Note that the metal film 5 and the oxide film 51, or the oxide film 51 only, were formed during the calcination of the activated alumina catalyst carrier layer 4 in these preferred embodiments.

Ninth Preferred Embodiments

These preferred embodiments employed the following heat resistance stainless steel flat sheets instead of the ferrite heat resistance stainless steel flat sheets containing 15% by weight of chromium used in the preferred embodiments described above. But the metal film 5 shown in FIG. 3 were formed by the spraying employed in the first preferred embodiments.

A ferrite heat resistance stainless steel flat sheet SUS430F (Japanese Industrial Standards) was employed by Catalyst No. 53. and zirconium and aluminum were sprayed on both surfaces of the flat sheet in this order in the following amounts: 1 part by weight of zirconium and 1 part by weight of aluminum per 100 parts by weight of a catalyst support.

A martensite heat resistance stainless steel flat sheet SUS440A (Japanese Industrial Standards) was employed by Catalyst No. 54, and zirconium and aluminum were sprayed on both surfaces of the flat sheet in this order in the following amounts: 5 parts by weight of zirconium and 5 parts by weight of aluminum per 100 parts by weight of a catalyst support.

An austenite heat resistance stainless steel flat sheet SUS304 (Japanese Industrial Standards) was employed by Catalyst No. 55, and zirconium and aluminum were sprayed on both surfaces of the flat sheet in this order in the following amounts: 10 parts by weight of zirconium and 10 parts by weight of aluminum per 100 parts by weight of a catalyst support.

The flat sheets thus sprayed were formed into the honeycomb catalyst supports 1 as described for the first preferred embodiments. After forming the catalyst support 1, the activated alumina carrier layer 4 was formed on the catalyst supports 1 and the metal catalysts 6, i.e. platinum and rhodium, were loaded in the catalyst carrier layer 4 to produce catalysts Nos. 53 through 55 as described for the first preferred embodiments. Note that the metal film 5 and the oxide film 51, or the oxide film 51 only, were formed during the calcination of the activated alumina catalyst carrier layer 4 in these preferred embodiments.

Tenth Preferred Embodiments

These preferred embodiments employed heat resistance stainless steel flat sheets containing aluminum instead of the ferrite heat resistance stainless steel flat sheets free from aluminum as employed in the preferred embodiments described above, and the metal film 5 shown in FIG. 3 were formed by spraying zirconium on the flat sheets.

The flat sheets containing aluminum in amounts listed in lines of the tenth preferred embodiments of Table 4 were subjected to zirconium spraying. The amounts of zirconium sprayed were also listed in Table 4, and are parts by weight per 100 parts by weight of a catalyst support. But the amounts of aluminum listed in Table 4 are weight percentages per the flat sheets.

The flat sheets were formed into the honeycomb catalyst supports 1, and the activated alumina catalyst carrier layer 4 was formed on the catalyst support 1. And then the metal catalysts 6, i.e. platinum and rhodium, were loaded in the activated alumina catalyst carrier layer 4 to produce catalysts Nos. 61 through 69 as described for the first preferred embodiments. Note that the metal film 5 and the oxide film 51, or the oxide film 51 only, were formed during the calcination of the activated alumina catalyst carrier layer 4 in these preferred embodiments.

Eleventh Preferred Embodiments

These preferred embodiments employed heat resistance stainless steel flat sheets containing aluminum instead of the ferrite heat resistance stainless steel flat sheets free from aluminum as employed in the preferred embodiments described above, and the metal film 5 shown in FIG. 3 were formed by immersion plating.

The flat sheets containing aluminum in amounts listed in lines of the eleventh preferred embodiments of Table 4 were prepared and subjected to immersion plating. The amounts of aluminum listed in Table 4 are weight percentages per the flat sheets.

The flat sheets were formed into the honeycomb catalyst supports 1 as described above, and they were immersed into an aqueous solution of oxynitrate zirconium, and dried at 200° C. after taking out of the aqueous solution. And the catalyst supports 1 with zirconium adhered were calcined at 600° C. for 2 hours to form the metal film 5 and the oxide film 51, or the oxide film 51 only, on them. The amounts of zirconium listed in Table 4 are parts by weight per 100 parts by weight of a catalyst support. However, when preparing catalyst No. 77, the catalyst support 1 was immersed into an aqueous solution of zirconium chloride instead of the aqueous solution of oxynitrate zirconium.

After forming the metal film 5 and the oxide film 51, or the oxide film 51 only, the activated alumina catalyst carrier layer 4 was formed on the catalyst supports 1. And then the metal catalysts 6, i.e. platinum and rhodium, were loaded in the activated alumina catalyst carrier layer 4 to produce catalysts Nos. 70 through 77 as described for the first preferred embodiments.

Twelfth Preferred Embodiments

These preferred embodiments employed heat resistance stainless steel flat sheets containing aluminum and zirconium instead of the ferrite heat resistance stainless steel flat sheets free from aluminum and zirconium as employed in the preferred embodiments described above.

The flat sheets containing aluminum and zirconium in amounts listed in lines of the twelfth preferred embodiments of Table 5 were formed into the honeycomb catalyst supports 1 as described above, and the activated alumina catalyst carrier layer 4 was formed on the catalyst supports 1. And then the metal catalysts 6, i.e. platinum and rhodium, were loaded in the activated alumina catalyst carrier layer 4 to produce catalysts Nos. 78 through 85 as described for the first preferred embodiments. Note that the metal film 5 and the oxide film 51, or the oxide film 51 only, were formed during the calcination of the activated alumina catalyst carrier layer 4 in these preferred embodiments. The amounts of aluminum and zirconium listed in Table 5 are weight percentages per the flat sheets.

Thirteenth Preferred Embodiments

These preferred embodiments employed heat resistance stainless steel flat sheets containing aluminum as the eleventh preferred embodiment did. But these employed fused-salt electrolysis to form the metal film 5 shown in FIG. 3 instead of the immersion plating in the aqueous solution of zirconium salts employed for producing the eleventh preferred embodiments.

The ferrite heat resistance stainless steel flat sheets containing aluminum were formed into the honeycomb catalyst supports 1 as described above, and subjected to fuse-salt electrolysis using potassium hexafluorozirconate. The amounts of zirconium adhered on the flat sheets are listed in lines of the thirteenth preferred embodiment of Table 5, and are parts by weight per 100 parts by weight of a catalyst support. However, when producing catalyst No. 93, the catalyst support 1 was subjected to fused-salt electrolysis using zirconium fluoride instead of potassium hexafluorozirconate.

After the fused-electrolysis, the activated alumina catalyst carrier layer 4 was formed on the catalyst supports 1. And then the metal catalysts 6, i.e. platinum and rhodium, were loaded in the activated alumina catalyst carrier layer 4 to produce catalysts Nos. 86 through 93 as described for the first preferred embodiments. Note that the metal film 5 and the oxide film 51, or the oxide film 51 only, were filmed during the calcination of the activated alumina catalyst carrier layer 4 in these preferred embodiments.

Fourteenth Preferred Embodiments

These preferred embodiments employed heat resistance stainless steel flat sheets containing aluminum instead of the ferrite heat resistance stainless steel flat sheets free from aluminum as employed in the preferred embodiments described above, and the metal film 5 shown in FIG. 3 were formed by electroplating.

The flat sheets containing aluminum in amounts listed in lines of the fourteenth preferred embodiments of Table 6 were subjected to electroplating. The amounts of aluminum listed in Table 6 are weight percentages per the flat sheets.

The flat sheets containing aluminum were formed into the honeycomb catalyst supports 1 as described above, and they were subjected to electroplating using an aqueous solution of oxynitrate zirconium. Thus, zirconium was electroplated on the catalyst supports 1 in amounts listed in the lines of the fourteenth preferred embodiments of Table 6. The amounts of zirconium listed in Table 6 are parts by weight per 100 parts by weight of a catalyst support. However, when producing catalyst No. 101, the catalyst support 1 was subjected to electroplating using an aqueous solution of zirconium chloride instead of the aqueous solution of oxynitrate zirconium.

After the electroplating, the activated alumina catalyst carrier layer 4 was formed on the catalyst supports 1. And then the metal catalysts 6, i.e. platinum and rhodium, were loaded in the activated alumina catalyst carrier layer 4 to produce catalysts Nos. 94 through 101 as described for the first preferred embodiments. Note that the metal film 5 and the oxide film 51, or the oxide film 51 only, were formed during the calcination of the activated alumina catalyst carrier layer 4 in these preferred embodiments.

Fifteenth Preferred Embodiments

These preferred embodiments employed heat resistance stainless steel flat sheets containing aluminum instead of the ferrite heat resistance stainless steel flat sheets free from aluminum as employed in the preferred embodiments described above, and the metal film 5 shown in FIG. 3 were formed by foil application with rolls.

The flat sheets containing aluminum in amounts listed in lines of the fifteenth preferred embodiments of Table 6 were prepared. The amounts of aluminum listed in Table 6 are weight percentages per the flat sheets.

Zirconium films were applied with rolls on the flat sheets containing aluminum. Laminated flat sheets thus prepared contained zirconium in amounts listed in the lines of the fifteenth preferred embodiments of Table 6. The amounts of zirconium listed in Table 6 are parts by weight per 100 parts by weight of a catalyst support. The laminated flat sheets were formed into the honeycomb catalyst supports 1 as described above.

After forming the catalyst supports 1, the activated alumina catalyst carrier layer 4 was formed on the catalyst supports 1. And then the metal catalysts 6, i.e. platinum and rhodium, were loaded in the activated alumina catalyst carrier layer 4 to produce catalysts Nos. 102 through 110 as described for the first preferred embodiments. Note that the metal film 5 and the oxide film 51, or the oxide film 51 only, were formed during the calcination of the activated alumina catalyst carrier layer 4 in these preferred embodiments.

Comparative Catalysts

A ferrite stainless steel flat sheet containing 15% by weight of chromium and 4% by weight of aluminum was prepared for comparative catalyst No. 150. The ferrite stainless steel flat sheet was formed into a flat plate and a corrugated plate. The corrugated plate was placed on the flat plate, and the overlapped plates were wound into a cylindrical form to use them as the honeycomb catalyst support 1. Then, the catalyst support 1 was immersed into a slurry, blown to remove the excess slurry, dried, and calcined to form the activated alumina catalyst carrier layer 4 on its surface as described for the first preferred embodiments. Next, the catalyst support 1 with the activated alumina catalyst carrier layer 4 was immersed into an aqueous solution of ammine platinum and then into an aqueous solution of rhodium chloride to load platinum by 1.0 g per 1 liter volume of a catalyst and rhodium by 0.2 g per 1 liter volume of a catalyst as described for the first preferred embodiments.

Thus, comparative catalyst No. 150 was produced. Comparative catalysts Nos. 151 and 152 were produced as comparative catalysts No. 150. But different ferrite solution steel flat sheets were employed by them: a ferrite stainless steel flat sheet containing 20% by weight of chromium and 5% by weight of aluminum was employed by comparative catalyst No. 151 and a ferrite stainless steel flat sheet containing 20% by weight of chromium and 8% by weight of aluminum was employed by comparative catalyst No. 152.

Evaluation

The catalysts thus produced were evaluated on their conversions, activated alumina catalyst carrier layer come-off rates and times at catalyst support abnormal oxidation.

The catalysts were first mounted on an exhaust system of 2000 c.c. engine. And they were aged under an aging cycle consisting of the following periods, and the aging cycle was repeated 200 times:

| First 1-hour period: | Air-fuel (A/F) ratio: | 14.6 |
| --- | --- | --- |
| | Catalyst bed temperature: | 700° C. |
| Second 0.5-hour period: | Air-fuel (A/F) ratio: | 14.0 |
| | Catalyst bed temperature: | 950° C. |

After the aging, the conversions of the catalysts were evaluated by using the same engine under the following conditions:

| Engine speed: | 2000 rpm |
| --- | --- |
| Negative pressure of intake manifold: | 360 mmHg |

According to the tables, the catalysts of the preferred embodiments showed the conversions around 90% or more for all of hydrocarbons (HC), carbon monoxide (CO) and nitrogen oxides (NOx). Consequently, it is apparent their conversions have been improved greatly when compared with those of the comparative catalysts Nos. 150 through 151 showing the conversions around 80% or less for HC, CO and NOx.

And the come-off rates were obtained by the following equation:

Come-off rate (%) = {(Catalyst weight before aging) −

(Catalyst weight after aging)} ÷

(Catalyst weight before aging) × 100

Although the come-off rates varied depending on the amounts of zirconium and aluminum in the metal film 5 and the oxide films 51, 52 and 53, the catalysts of the preferred embodiments generally showed the come-off rates of around 10% or less. While the comparative catalysts showed the come-off rates of around 15% or more. This means that the catalysts of the preferred embodiments are less likely to be degraded than the comparative catalysts.

The times at catalyst support abnormal oxidation were times required to increase the weight of the catalysts by oxidizing them at 1150° C. The time at catalyst support abnormal oxidation for comparative catalyst No. 150 without the metal film 5 and the oxide film 51 was 50 hours, the time for comparative catalyst No. 151 containing more chromium and aluminum than comparative catalyst No. 150 was 180 hours, and the time for comparative catalyst No. 152 containing much more chromium and aluminum than comparative catalyst No. 150 was 275 hours. These values mean that the oxidation of the catalyst supports started in the comparative catalysts at around the times.

On the other hand, the following catalysts of the preferred embodiments having the metal film 5 and the oxide film 51, the oxide film 51 only or the oxide films 52 and 53 containing 5 parts or more by weight of zirconium per 100 parts by weight of a catalyst support showed a remarkably improved durability, i.e. 400 hours or more of the time at catalyst support abnormal oxidation:

Catalysts Nos. 2 through 6 in the first preferred embodiments;

Catalysts Nos. 9 through 13 in the second preferred embodiments;

Catalysts Nos. 16 through 20 in the third preferred embodiments;

Catalysts Nos. 23 through 27 in the fourth preferred embodiments;

Catalysts Nos. 30 through 34 in the fifth preferred embodiments;

Catalysts Nos. 36 through 40 in the sixth preferred embodiments;

Catalysts Nos. 42 through 46 in the seventh preferred embodiments;

Catalysts Nos. 48 through 52 in the eighth preferred embodiments;

Catalysts Nos. 54 and 55 in the ninth preferred embodiments;

Catalysts Nos. 67 through 69 in the tenth preferred embodiments;

Catalyst No. 76 in the eleventh preferred embodiments;

Catalyst No. 85 in the twelfth preferred embodiments;

Catalyst No. 92 in the thirteenth preferred embodiments;

Catalyst No. 100 in the fourteenth preferred embodiments; and

Catalysts Nos. 108 through 110 in the fifteenth preferred embodiments;

Although the following catalysts of the preferred embodiments had the metal film 5 and the oxide film 51, the oxide film 51 only or the oxide films 52 and 53 containing less than 5 parts by weight of zirconium per 100 parts by weight of a catalyst support, they also showed a remarkable improved durabilty, i.e. from at least 325 hours to 400 hours or more of the time at catalyst support abnormal oxidation, compared with those of the comparative catalysts:

Catalyst No. 1 in the first preferred embodiments;
Catalyst No. 8 in the second preferred embodiments;
Catalyst No. 15 in the third preferred embodiments;
Catalyst No. 22 in the fourth preferred embodiments;
Catalyst No. 29 in the fifth preferred embodiments;
Catalyst No. 35 in the sixth preferred embodiments;
Catalyst No. 41 in the seventh preferred embodiments;
Catalyst No. 47 in the eighth preferred embodiments;
Catalyst No. 53 in the ninth preferred embodiments;
Catalysts Nos. 61 through 66 in the tenth preferred embodiments;
Catalysts Nos. 70 through 75, and 77 in the eleventh preferred embodiments;
Catalysts Nos. 78 through 84 in the twelfth preferred embodiments;
Catalysts Nos. 86 through 91, and 93 in the thirteenth preferred embodiments;

Catalysts Nos. 94 through 99, and 101 in the fourteenth preferred embodiments; and Catalysts Nos. 102 through 107 in the fifteenth preferred embodiments;

Further, Catalysts Nos. 7, 14, 21 and 28 respectively of the first, second, third and fourth preferred embodiments showed the time of 350 hours at catalyst support abnormal oxidation. This means that the changing the order of zirconium and aluminum films formation did not adversely affect the conversions, the come-off rates and the durability of the catalysts.

Since all of the catalysts of the preferred embodiments showed improved conversions, come-off rates and times at catalyst support abnormal oxidation, any method for forming the metal film 5 may be employed. In addition, metal film 5 and the oxide film 51, or the oxide film 51 only, made of zirconium and aluminum may be formed independently of the order of zirconium and aluminum deposition or simultaneously. Further, the metal film 5 and the oxide film 51, or the oxide film 51 only, made of zirconium only may be formed, or a composite oxide film may be formed out of a stainless steel flat sheet containing zirconium as well as aluminum.

TABLE 1

| Preferred Embodiment | Catalyst No. | Method | Film Component 1st Op. Metal | Amount | 2nd Op. Metal | Amount | Conversions (%) HC | CO | NOx | Come-off Rate (%) | Time at Abnormal Oxidation (hr) |
|---|---|---|---|---|---|---|---|---|---|---|---|
|   | 1 | Spraying | Zr | 1 | Al | 1 | 91 | 92 | 91 | 8.7 | 350 |
|   | 2 |   | ↑ | 5 | ↑ | 5 | 95 | 96 | 96 | 5.0 | 400 or more |
|   | 3 |   | ↑ | 10 | ↑ | 10 | 99 | 98 | 99 | 2.1 | ↑ |
| 1 | 4 |   | ↑ | 20 | ↑ | 20 | 99 | 100 | 100 | 0.7 | ↑ |
|   | 5 |   | ↑ | 5 | ↑ | 10 | 99 | 98 | 98 | 2.1 | ↑ |
|   | 6 |   | ↑ | 10 | ↑ | 5 | 98 | 99 | 98 | 2.4 | ↑ |
|   | 7 |   | Al | 5 | Zr | 5 | 88 | 89 | 87 | 10.2 | 350 |
|   | 8 | Immersion | Zr | 1 | Al | 1 | 90 | 91 | 91 | 9.8 | 325 |
|   | 9 | Plating | ↑ | 5 | ↑ | 5 | 93 | 92 | 91 | 6.2 | 400 or more |
|   | 10 |   | ↑ | 10 | ↑ | 10 | 96 | 97 | 99 | 3.0 | ↑ |
| 2 | 11 |   | ↑ | 20 | ↑ | 20 | 98 | 99 | 99 | 1.2 | ↑ |
|   | 12 |   | ↑ | 5 | ↑ | 10 | 95 | 96 | 98 | 2.8 | ↑ |
|   | 13 |   | ↑ | 10 | ↑ | 5 | 98 | 99 | 98 | 2.5 | ↑ |
|   | 14 |   | Al | 5 | Zr | 5 | 89 | 89 | 87 | 10.1 | 350 |
|   | 15 | Electro- | Zr | 1 | Al | 1 | 89 | 90 | 91 | 9.7 | 340 |
|   | 16 | Plating | ↑ | 5 | ↑ | 5 | 95 | 95 | 96 | 5.9 | 400 or more |
|   | 17 |   | ↑ | 10 | ↑ | 10 | 95 | 96 | 98 | 2.8 | ↑ |
| 3 | 18 |   | ↑ | 20 | ↑ | 20 | 98 | 99 | 99 | 1.1 | ↑ |
|   | 19 |   | ↑ | 5 | ↑ | 10 | 95 | 96 | 98 | 2.4 | ↑ |
|   | 20 |   | ↑ | 10 | ↑ | 5 | 94 | 96 | 97 | 2.6 | ↑ |
|   | 21 |   | Al | 5 | Zr | 5 | 91 | 90 | 92 | 9.9 | 350 |

TABLE 2

| Preferred Embodiment | Catalyst No. | Method | Film Component 1st Op. Metal | Amount | 2nd Op. Metal | Amount | Conversions (%) HC | CO | NOx | Come-off Rate (%) | Time at Abnormal Oxidation (hr) |
|---|---|---|---|---|---|---|---|---|---|---|---|
|   | 22 | Foil | Zr | 1 | Al | 1 | 91 | 90 | 93 | 9.2 | 365 |
|   | 23 | Appli- | ↑ | 5 | ↑ | 5 | 95 | 96 | 96 | 4.8 | 400 or more |
|   | 24 | cation | ↑ | 10 | ↑ | 10 | 98 | 99 | 98 | 2.3 | ↑ |
| 4 | 25 | with | ↑ | 20 | ↑ | 20 | 99 | 100 | 99 | 0.8 | ↑ |
|   | 26 | Rolls | ↑ | 5 | ↑ | 10 | 99 | 98 | 98 | 2.1 | ↑ |
|   | 27 |   | ↑ | 10 | ↑ | 5 | 98 | 99 | 98 | 2.3 | ↑ |
|   | 28 |   | Al | 5 | Zr | 5 | 90 | 91 | 90 | 9.8 | 350 |
|   | 29 | Spraying, | Zr | 1 | Al | 1 | 92 | 91 | 91 | 8.6 | 350 |
|   | 30 | simul- | ↑ | 5 | ↑ | 5 | 96 | 95 | 96 | 5.1 | 400 or more |
|   | 31 | taneously | ↑ | 10 | ↑ | 10 | 99 | 98 | 98 | 2.3 | ↑ |
| 5 | 32 |   | ↑ | 20 | ↑ | 20 | 99 | 100 | 99 | 0.9 | ↑ |
|   | 33 |   | ↑ | 5 | ↑ | 10 | 98 | 99 | 98 | 2.4 | ↑ |
|   | 34 |   | ↑ | 10 | ↑ | 5 | 99 | 98 | 98 | 2.1 | ↑ |
|   | 35 |   | Zr | 1 | Al | 1 | 91 | 90 | 91 | 9.6 | 330 |
|   | 36 | Immersion | ↑ | 5 | ↑ | 5 | 92 | 91 | 93 | 6.1 | 400 or more |
|   | 37 | Plating, | ↑ | 10 | ↑ | 10 | 96 | 97 | 98 | 2.9 | ↑ |
|   | 38 | simul- | ↑ | 20 | ↑ | 20 | 98 | 99 | 99 | 1.3 | ↑ |
| 6 | 39 | taneously | ↑ | 5 | ↑ | 5 | 95 | 98 | 96 | 2.6 | ↑ |
|   | 40 |   | ↑ | 10 | ↑ | 10 | 99 | 98 | 98 | 2.4 | ↑ |

TABLE 3

| Preferred Embodiment | Catalyst No. | Method | Film Component 1st Op. Metal | Amount | 2nd Op. Metal | Amount | Conversions (%) HC | CO | NOx | Come-off Rate (%) | Time at Abnormal Oxidation (hr) |
|---|---|---|---|---|---|---|---|---|---|---|---|
|   | 41 | Electro- | Zr | 1 | Al | 1 | 89 | 91 | 90 | 9.9 | 340 |
|   | 42 | plating, | ↑ | 5 | ↑ | 5 | 95 | 96 | 95 | 5.8 | 400 or more |
|   | 43 | simul- | ↑ | 10 | ↑ | 10 | 98 | 96 | 95 | 2.7 | ↑ |

TABLE 3-continued

| Preferred Embodiment | Catalyst No. | Method | Film Component 1st Op. Metal | 1st Op. Amount | 2nd Op. Metal | 2nd Op. Amount | Conversions (%) HC | CO | NOx | Come-off Rate (%) | Time at Abnormal Oxidation (hr) |
|---|---|---|---|---|---|---|---|---|---|---|---|
| 7 | 44 | taneously | ↑ | 20 | ↑ | 20 | 99 | 98 | 99 | 1.2 | ↑ |
|  | 45 |  | ↑ | 5 | ↑ | 10 | 96 | 95 | 98 | 2.3 | ↑ |
|  | 46 |  | ↑ | 10 | ↑ | 5 | 97 | 96 | 94 | 2.5 | ↑ |
|  | 47 | Alloy | Zr | 1 | Al | 1 | 90 | 91 | 93 | 9.4 | 360 |
|  | 48 | Foil | ↑ | 5 | ↑ | 5 | 95 | 96 | 96 | 4.7 | 400 or more |
|  | 49 | Appli- | ↑ | 10 | ↑ | 10 | 98 | 99 | 98 | 2.1 | ↑ |
| 8 | 50 | cation | ↑ | 20 | ↑ | 20 | 99 | 100 | 99 | 0.7 | ↑ |
|  | 51 | with | ↑ | 5 | ↑ | 10 | 99 | 98 | 98 | 2.2 | ↑ |
|  | 52 | Rolls | ↑ | 10 | ↑ | 5 | 98 | 99 | 98 | 2.2 | ↑ |
|  | 53 |  | Zr | 1 | Al | 1 | 96 | 96 | 97 | 5.0 | 400 or more |
| 9 | 54 | Spraying | ↑ | 5 | ↑ | 5 | 97 | 96 | 96 | 4.9 | ↑ |
|  | 55 |  | ↑ | 10 | ↑ | 10 | 96 | 95 | 98 | 5.0 | ↑ |

TABLE 4

| Preferred Embodiment | Catalyst No. | Method | Catalyst Support Component | Zr Amount | Conversions (%) HC | CO | NOx | Come-off Rate (%) | Time at Abnormal Oxidation (hr) |
|---|---|---|---|---|---|---|---|---|---|
|  | 61 |  | 15Cr—4Al | 1 | 92 | 92 | 93 | 9.9 | 400 or more |
|  | 62 |  | 20Cr—5Al | 1 | 96 | 97 | 95 | 6.0 | ↑ |
|  | 63 |  | 20Cr—8Al | 1 | 95 | 96 | 95 | 5.6 | ↑ |
| 10 | 64 | Spraying | 15Cr—4Al | 0.5 | 91 | 92 | 91 | 8.7 | 400 |
|  | 65 |  | 15Cr—4Al | 2 | 95 | 96 | 96 | 5.0 | 400 or more |
|  | 66 |  | 15Cr—4Al | 4 | 99 | 98 | 98 | 2.1 | ↑ |
|  | 67 |  | 15Cr—4Al | 8 | 99 | 100 | 100 | 0.7 | ↑ |
|  | 68 |  | 15Cr—4Al | 16 | 98 | 99 | 98 | 2.4 | ↑ |
|  | 69 |  | 15Cr—4Al | 30 | 96 | 95 | 97 | 4.6 | ↑ |
|  | 70 |  | 15Cr—4Al | 1 | 91 | 90 | 91 | 8.3 | ↑ |
|  | 71 |  | 20Cr—5Al | 1 | 93 | 92 | 94 | 7.6 | ↑ |
|  | 72 | Immersion | 20Cr—8Al | 1 | 93 | 95 | 94 | 6.1 | ↑ |
| 11 | 73 | Plating | 15Cr—4Al | 0.5 | 94 | 93 | 92 | 6.7 | 400 |
|  | 74 |  | 15Cr—4Al | 2 | 94 | 96 | 94 | 5.3 | 400 or more |
|  | 75 |  | 15Cr—4Al | 4 | 97 | 96 | 97 | 3.8 | ↑ |
|  | 76 |  | 15Cr—4Al | 10 | 99 | 98 | 99 | 1.8 | ↑ |
|  | 77 |  | 15Cr—4Al | 4 | 91 | 90 | 90 | 8.8 | ↑ |

TABLE 5

| Preferred Embodiment | Catalyst No. | Method | Catalyst Support Component | Zr Amount | Conversions (%) HC | CO | NOx | Come-off Rate (%) | Time at Abnormal Oxidation (hr) |
|---|---|---|---|---|---|---|---|---|---|
|  | 78 |  | 15Cr—4Al—1Zr | — | 91 | 91 | 92 | 8.5 | 400 or more |
|  | 79 |  | 20Cr—5Al—1Zr | — | 91 | 92 | 90 | 7.8 | ↑ |
|  | 80 | Catalyst | 20Cr—8Al—1Zr | — | 94 | 90 | 92 | 6.5 | ↑ |
| 12 | 81 | Support | 15Cr—4Al—0.05Zr | — | 88 | 89 | 87 | 10.8 | 350 |
|  | 82 | contain- | 15Cr—4Al—0.5Zr | — | 89 | 90 | 93 | 9.4 | 400 |
|  | 83 | ing | 15Cr—4Al—2Zr | — | 94 | 95 | 94 | 5.3 | 400 or more |
|  | 84 | Zr | 15Cr—4Al—4Zr | — | 96 | 97 | 94 | 3.9 | ↑ |
|  | 85 |  | 15Cr—4Al—10Zr | — | 98 | 99 | 97 | 1.7 | ↑ |
|  | 86 |  | 15Cr—4Al | 1 | 93 | 91 | 94 | 7.5 | ↑ |
|  | 87 | Fused- | 20Cr—5Al | 1 | 92 | 93 | 92 | 7.2 | ↑ |
|  | 88 | salt | 20Cr—8Al | 1 | 94 | 92 | 93 | 6.7 | ↑ |
| 13 | 89 | Electrol- | 15Cr—4Al | 0.5 | 91 | 93 | 89 | 8.1 | 400 |
|  | 90 | ysis | 15Cr—4Al | 2 | 94 | 96 | 95 | 5.3 | 400 or more |
|  | 91 |  | 15Cr—4Al | 4 | 95 | 96 | 98 | 2.7 | ↑ |
|  | 92 |  | 15Cr—4Al | 10 | 99 | 99 | 100 | 0.7 | ↑ |
|  | 93 |  | 15Cr—4Al | 1 | 90 | 91 | 92 | 7.8 | ↑ |

TABLE 6

| Preferred Embodiment | Catalyst No. | Method | Catalyst Support Component | Zr Amount | Conversions (%) HC | CO | NOx | Come-off Rate (%) | Time at Abnormal Oxidation (hr) |
|---|---|---|---|---|---|---|---|---|---|
|  | 94 |  | 15Cr—4Al | 1 | 90 | 93 | 91 | 8.0 | 400 or more |
|  | 95 |  | 20Cr—5Al | 1 | 91 | 93 | 92 | 7.0 | ↑ |
|  | 96 | Electro- | 20Cr—8Al | 1 | 94 | 92 | 92 | 6.3 | ↑ |
| 14 | 97 | Plating | 15Cr—4Al | 0.5 | 90 | 91 | 90 | 8.5 | 400 |
|  | 98 |  | 15Cr—4Al | 2 | 95 | 95 | 96 | 5.8 | 400 or more |
|  | 99 |  | 15Cr—4Al | 4 | 97 | 96 | 98 | 3.9 | ↑ |

TABLE 6-continued

| Preferred Embodiment | Catalyst No. | Method | Catalyst Support Component | Zr Amount | Conversions (%) HC | CO | NOx | Come-off Rate (%) | Time at Abnormal Oxidation (hr) |
|---|---|---|---|---|---|---|---|---|---|
| | 100 | | 15Cr—4Al | 10 | 98 | 99 | 99 | 1.3 | ↑ |
| | 101 | | 15Cr—4Al | 1 | 91 | 90 | 90 | 7.9 | ↑ |
| | 102 | | 15Cr—4Al | 1 | 90 | 92 | 91 | 8.1 | ↑ |
| | 103 | Foil | 20Cr—5Al | 1 | 94 | 93 | 92 | 6.8 | ↑ |
| | 104 | Application | 20Cr—8Al | 1 | 95 | 94 | 91 | 6.7 | ↑ |
| 15 | 105 | with | 15Cr—4Al | 0.5 | 90 | 91 | 89 | 9.0 | 400 |
| | 106 | Rolls | 15Cr—4Al | 2 | 96 | 98 | 92 | 5.1 | 400 or more |
| | 107 | | 15Cr—4Al | 4 | 97 | 98 | 96 | 2.7 | ↑ |
| | 108 | | 15Cr—4Al | 8 | 98 | 99 | 98 | 1.6 | ↑ |
| | 109 | | 15Cr—4Al | 16 | 96 | 95 | 98 | 3.5 | ↑ |
| | 110 | | 15Cr—4Al | 30 | 95 | 96 | 94 | 4.8 | ↑ |
| Comparative Examples | 150 | | 15Cr—4Al | — | 74 | 78 | 71 | 23.9 | 50 |
| | 151 | | 20Cr—5Al | — | 82 | 80 | 79 | 17.6 | 180 |
| | 152 | | 20Cr—8Al | — | 86 | 83 | 82 | 14.8 | 275 |

What is claimed is:

1. An exhaust gas purifying catalyst comprising:
a heat resistant stainless steel catalyst support:
an oxide film containing aluminum oxide and zirconium oxide formed on said heat resistant stainless steel catalyst support:
an activated alumina catalyst carrier layer formed on said oxide film; and
at least one metal catalyst loaded in said activated alumina catalyst carrier layer.

2. An exhaust gas purifying catalyst according to claim 1, wherein said oxide film contains zirconium and aluminum in total from 0.01 to 40 parts by weight per 100 parts by weight of said heat resistant stainless steel catalyst support.

3. An exhaust gas purifying catalyst according to claim 2, wherein said oxide film contains zirconium from 0.01 to 30 parts by weight per 100 parts by weight of said heat resistant stainless steel catalyst support and aluminum from 0.01 to 30 parts by weight per 100 parts by weight of said heat resistance stainless steel catalyst support.

4. An exhaust gas purifying catalyst according to claim 1, wherein said oxide film is made by one method selected from the group of spraying, immersion plating, electroplating, and metal foil application with rolls.

5. An exhaust gas purifying catalyst according to claim 1, wherein said heat resistant stainless steel catalyst support contains zirconium and aluminum and said oxide film is formed by heating said support and oxidizing said zirconium and aluminum.

6. An exhaust gas purifying catalyst according to claim 1, wherein said oxide film contains composite oxides of zirconium oxide and aluminum oxide.

7. An exhaust gas purifying catalyst according to claim 1, wherein said aluminum oxide contains gamma-alumina, theta-alumina or delta-alumina.

8. An exhaust gas purifying catalyst according to claim 1, wherein said heat resistant stainless steel catalyst support is made of ferrite stainless steel.

9. An exhaust gas purifying catalyst according to claim 8, wherein said ferrite stainless steel contains at least one of zirconium and aluminum as an alloy component.

10. An exhaust gas purifying catalyst according to claim 1, wherein said heat resistant stainless steel catalyst support is made of martensite stainless steel.

11. An exhaust gas purifying catalyst according to claim 1, wherein said heat resistant stainless steel catalyst support is made of austenite stainless steel.

12. An exhaust gas purifying catalyst comprising:
a catalyst support made of heat resistant stainless steel;
a metal film formed on said catalyst support and comprising aluminum and zirconium;
an oxide film formed on said metal film by oxidizing the surface of said metal film and comprising aluminum oxide and zirconium oxide;
a catalyst carrier layer formed on said oxide film and comprising porous oxide; and
at least one metal catalyst loaded in said catalyst carrier layer.

13. An exhaust gas purifying catalyst according to claim 12, wherein said heat resistant stainless steel is at least one of martensite heat resistant stainless steel, ferrite heat resistant stainless steel and austenite heat resistant stainless steel.

14. An exhaust gas purifying catalyst according to claim 13, wherein said heat resistant stainless steel is ferrite heat resistant stainless steel which contains at least one of zirconium and aluminum as an alloy component.

15. An exhaust gas purifying catalyst according to claim 12, wherein said zirconium and aluminum are contained in said metal film and oxide film in total in an amount of from 0.01 to 30 parts by weight per 100 parts by weight of said catalyst support.

16. An exhaust gas purifying catalyst according to claim 15, wherein said zirconium is contained in said metal film and oxide film in an amount of from 0.01 to 30 parts by weight per 100 parts by weight of said catalyst support, and said aluminum is contained in said metal film and oxide film in an amount of from 0.01 to 30 parts by weight per 100 parts by weight of said catalyst support.

17. An exhaust gas purifying catalyst according to claim 12, wherein said oxide film contains composite oxides of zirconium oxide and aluminum oxide.

18. An exhaust gas purifying catalyst according to claim 12, wherein said porous oxide contains at least one of gamma-alumina, theta-alumina and delta-alumina.

19. An exhaust gas purifying catalyst according to claim 12, wherein said catalyst support is made of martensite stainless steel.

20. An exhaust gas purifying catalyst according to claim 12, wherein said metal film is made by one method selected from the group of spraying, immersion plating, electroplating and metal foil application with rolls, and said oxide film is formed by heating said metal film.

21. An exhaust gas purifying catalyst according to claim 20, wherein said oxide film is formed by heating said metal film at a temperature of from 600° to 1000° C.

22. An exhaust gas purifying catalyst according to claim 20, wherein said zirconium is applied first and then said aluminum is applied.

23. An exhaust gas purifying catalyst according to claim 20, wherein said aluminum is applied first and then zirconium is applied.

24. An exhaust gas purifying catalyst according to claim 20, wherein said zirconium and aluminum are applied simultaneously.

* * * * *